UNITED STATES PATENT OFFICE 2,091,145

DYEING PROCESS

Norman Hulton Haddock, Frank Lodge, and Colin Henry Lumsden, Blackley, Manchester, England, assignors to Imperial Chemical Industries Limited, a corporation of Great Britain No Drawing. Application November 30, 1934, Serial No. 755,510. In Great Britain December 1, 1933

5 Claims. (Cl. 8—5)

This invention relates to a new process for dyeing animal fibres according to which a coloured imide is made in or upon the fibre from a dicarboxylic acid and an amine or ammonia, according to the equation

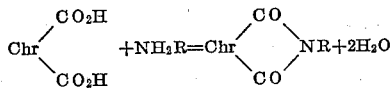

where Chr is a chemical grouping coming within the category of chromogens or nuclei capable of forming a chromogen and which represents an anthraquinone, perylene or azo derivative (see for example Wahl, Manufacture of Organic Dyestuffs, translated by Atack, London, 1918, page 76) and R is H, alkyl or aryl.

The invention will be described with reference to known chemical compounds, but it will be understood that it is not limited to processes wherein such compounds are used; it contemplates the application of similar compounds. Suitable dicarboxylic acids are those containing adjacent carboxylic groups capable of forming internal anhydrides which are five or six membered rings as for instance o-phthalic acids carrying chromophoric groups, naphthalene o- and peri-dicarboxylic acids carrying chromophoric groups and perylene-3:4:9:10-tetracarboxylic acid. Suitable compounds for converting these acids to imides are ammonia or alkylamine or arylamines or such compounds of these with weak acids as will generate these bases under the conditions of dyeing.

Although in the equation the dicarboxylic acid is shown as the free acid for the sake of convenience, the formula must be read to stand for the free acid or its salt according to which takes part in imide formation.

Working according to the invention, an insoluble colour, containing a valuable vat dye chromophore may be obtained from a soluble compound. While the fastness of the dyeings obtained by our process depends in part on the dicarboxylic acids and amines used, it is in general possible to obtain shades of very good to excellent fastness to washing, milling and potting.

Although sulphonic acid or other groups adapted to confer solubility may be present in addition to the essential carboxylic groups in the starting compounds, these will preferably be absent when fastness to washing, milling and potting are important.

The following examples in which parts are by weight illustrate but do not limit the invention.

Example 1

0.2 part of perylene-3:4:9:10-tetracarboxylic acid is dissolved in 200 parts of hot water by the aid of 0.2 part of ammonia solution (sp. gr. 0.880). The solution is raised to the boil, 5 parts of well-wetted wool and 2 parts of common salt are added and dyeing carried out at the boil for 2½ hours. The wool is rinsed in cold water and boiled out with dilute ammonia until the small proportion of unchanged perylene tetracarboxylic acid adhering to the fibre has been removed. The dyed fibre is a claret shade, having good fastness to rubbing, potting and alkaline milling.

Example 2

0.2 part of perylene-3:4:9:10-tetracarboxylic acid is dissolved in 200 parts of water and 0.3 part of 20% solution of methylamine at 80° C. 5 parts of wool and 2 parts of common salt are entered, and the dyeing carried out at the boil for 2½ hours. The dyed wool is rinsed in cold water and treated as in Example 1 to remove unchanged perylene-tetracarboxylic acid. The shade is red, yellower than that of Example 1. It shows excellent fastness to potting and alkaline milling.

Example 3

0.2 part of the dyestuff obtained by diazotizing 3-amino-naphthalic acid and coupling with β-naphthol (British Patent 246,394) is dissolved at the boil in 200 parts of water containing 0.1 part of soda ash. 5 parts of wool are entered and 0.6 part of ammonium acetate. Dyeing is carried out at the boil during 2½ hours. The wool is rinsed in cold water and any unchanged dicarboxylic acid extracted in the manner described in Example 1.

The final dyeing is an orange shade having good rubbing fastness and excellent fastness to potting and alkaline milling.

Example 4

0.2 part of the dyestuff having the constitution

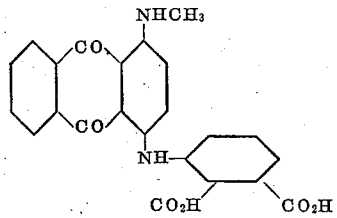

and obtained by interacting 1-bromo-4-methylaminoanthraquinone with 3-aminophthalic acid in phenol, is dissolved in 200 parts of water and 2 parts of ammonia solution (sp. gr. 0.880). The solution is stirred at 80° C., 2 parts of salt are added and 5 parts of well-wetted wool entered and dyed at 90° C. for 2 hours. The dye-bath is then raised to the boil for 2 hours when the dyed fibre is removed, rinsed in cold water and boiled out with dilute ammonia as in Example 1, to remove unchanged dicarboxylic acid. The dyeing obtained is bluish green of excellent fastness to washing, potting, milling and rubbing.

*Example 5*

0.2 part of the dyestuff having the constitution

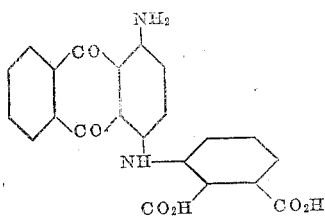

and obtained by interacting 1-bromo-4-aminoanthraquinone and 3-amino-phathalic acid in phenol solution, is dissolved in 200 parts of water containing 2 parts of ammonia solution (sp. gr. 0.880). The solution is stirred at the boil and 2 parts of salt added. 5 parts of well-wetted wool are now entered and dyed at the boil for 3 hours. The dyed fibre is removed and treated with dilute ammonia as in Example 1 to remove unchanged dicarboxylic acid.

The deep reddish-blue shade thus obtained is exceedingly fast to washing, potting and rubbing.

*Example 6*

0.2 part of the dyestuff having the constitution

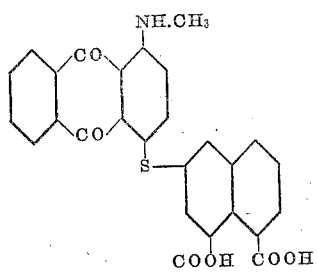

and obtained by the interaction of 1-bromo-4-methylaminoanthraquinone and 3-mercaptonaphthalic acid in pyridine solution is dissolved in 200 parts of water containing 0.1 part of soda ash. 5 parts of well-wetted wool are now entered and 5 parts of 10% ammonium acetate solution. The dyeing process is carried out at the boil during 1½ hours, after which the wool is rinsed in dilute ammonia as in Example 1. A violet shade is obtained which is fast to washing, potting and rubbing.

*Example 7*

23.1 parts of 3-aminonaphthalic acid are dissolved in 250 parts of water with the aid of sufficient caustic soda to make the resulting solution faintly alkaline to test paper. A solution of 6.9 parts of sodium nitrite in 30 parts of water is added and the mixture, after cooling to 10° C., is added slowly with stirring to 40 parts of hydrochloric acid (36%) diluted with 200 parts of water. When completely formed, the brown suspension of diazo compound is allowed to run into a solution of 17.4 parts of 1-phenyl-3-methyl-5-pyrazolone in 200 parts of caustic soda solution (2%) to which 20 parts of anhydrous sodium carbonate have been added.

On completion of the coupling the dyestuff is salted out, filtered off and dried.

When applied to wool according to the procedure of Example 3 above, it yields reddish yellow shades of good fastness to severe washing, milling and light.

By using as coupling component 39 parts of 2-phenylamino-8-naphthol-6-sulphonanilide in place of the 1-phenyl-3-methyl-5-pyrazolone in the above combination, the resulting dyestuff yields deep brown shades of similar good fastness to severe washing, milling and light.

*Example 8*

A diazo suspension obtained as in Example 6 from 23.1 parts of 4-aminonaphthalic acid is stirred at the ordinary temperature into a solution of 14.4 parts of m-toluidine hydrochloride in 250 parts of water, the mineral acidity of the mixture is removed by addition of sodium acetate and coupling is allowed to complete in the course of 12 hours. The dyestuff is then filtered off and dried. It dyes wool, by the process of Example 3 above, in yellowish brown shades of good fastness to severe washing, milling and light.

Silk is dyed in a manner similar to that employed for wool.

Although in the examples the dicarboxylic acid is converted into its imide on the fibre by treatment with ammonia, it is to be understood that the invention is not limited thereto. By using aqueous solutions or suspensions of primary alkylamines (e. g. methylamine, ethylamine, amylamine, octylamine) or primary arylamines (e. g. aniline, o-toluidine, m-toluidine, p-toluidine, xylidines, p-chloroaniline, m-nitro-p-toluidine) in place of ammonia, other imides (alkylimides and arylimides) are produced on the fibre with similar results. The ammonia or alkylamine or arylamine may be applied as aqueous solutions or suspensions either of the free bases or of their salts with weak acids (e. g. as carbonates, acetates or the like).

The range of dicarboxylic acids which give useful results by the process of our invention is wide, and is not limited to those specifically mentioned in the examples. Any dicarboxylic acid (in which term is included the salts of the acid) capable of forming an internal anhydride may be applied provided that it contains an anthraquinone residue, a perylene residue, or one or more azo groups within the molecule which are in themselves chromogens or contain nuclei capable of forming chromogen when reacted with ammonia or amines.

As many apparently widely different embodiments of this invention may be made without departing from the spirit and scope thereof, it is to be understood that we do not limit ourselves to the specific embodiments thereof except as defined in the appended claims.

We claim:

1. Process for the dyeing of animal fibres which comprises applying thereto an internal-anhydride-forming dicarboxylic acid chosen from the class of compounds consisting of anthraquinone, perylene and azo compounds and converting the dicarboxylic acid on the fibre into the corresponding dicarboxylic imide by reacting therewith a compound of the class consisting of ammonia, alkyl and aryl amines.

2. Process according to claim 1 in which the application of the dicarboxylic acid to the fibre and its conversion on the fibre into the corresponding imide are effected in one operation.

3. Process for the dyeing of animal fibres which comprises applying thereto from an aqueous solution a perylenetetracarboxylic acid capable of conversion into an internal dianhydride, and aqueous ammonia solution, dyeing being effected at temperature at substantially the boiling point of the solution.

4. The process for dyeing animal fibers which comprises applying thereto in an aqueous dye bath an internal anhydride forming dicarboxylic acid chosen from the class of compounds of the anthraquinone, perylene and azo series and reacting upon the same with ammonia, the reaction being carried out at a temperature not above the boiling point of the solution.

5. The process for dyeing animal fibers which comprises applying thereto in an aqueous solution an internal anhydride forming dicarboxylic acid containing a chromogen of the anthraquinone series and reacting upon the same with ammonia at a temperature not above the boiling point of the dye bath.

NORMAN HULTON HADDOCK.
FRANK LODGE.
COLIN HENRY LUMSDEN.